United States Patent [19]

Inoue et al.

[11] Patent Number: 5,187,802
[45] Date of Patent: Feb. 16, 1993

[54] VIRTUAL MACHINE SYSTEM WITH VITUAL MACHINE RESETTING STORE INDICATING THAT VIRTUAL MACHINE PROCESSED INTERRUPT WITHOUT VIRTUAL MACHINE CONTROL PROGRAM INTERVENTION

[75] Inventors: Taro Inoue, Kawasaki; Hidenori Umeno, Kanagawa; Toru Ohtsuki, Hadano; Kiyoshi Ogawa, Yokohama, all of Japan

[73] Assignee: Hitachi, Ltd., Tokyo, Japan

[21] Appl. No.: 452,240

[22] Filed: Dec. 18, 1989

[30] Foreign Application Priority Data

Dec. 26, 1988 [JP] Japan ............... 63-325802

[51] Int. Cl.⁵ ............................................. G06F 13/14
[52] U.S. Cl. ............................ 395/800; 395/275; 395/325; 364/DIG. 1; 364/232.1
[58] Field of Search ... 364/200 MS File, 900 MS File; 395/700, 325, 800, 275

[56] References Cited

U.S. PATENT DOCUMENTS

| | | | |
|---|---|---|---|
| 4,494,189 | 1/1985 | Bean et al. | 395/650 |
| 4,764,864 | 8/1988 | Takane | 364/200 |
| 4,812,967 | 3/1989 | Hirosawa et al. | 364/200 |
| 4,814,975 | 3/1989 | Hirosawa et al. | 364/200 |
| 4,837,674 | 6/1989 | Takane | 364/200 |
| 4,860,190 | 8/1989 | Kaneda et al. | 364/200 |
| 4,885,681 | 12/1989 | Umeno et al. | 364/200 |
| 4,887,202 | 12/1989 | Tanaka et al. | 364/200 |

FOREIGN PATENT DOCUMENTS

150039A2 7/1985 European Pat. Off.
60-150140 8/1985 Japan.

*Primary Examiner*—Thomas C. Lee
*Assistant Examiner*—L. Donaghue
*Attorney, Agent, or Firm*—Antonelli, Terry, Stout & Kraus

[57] ABSTRACT

In a virtual machine system in which a virtual machine directly executes operations by use of the hardware without an intervention from the virtual machine control program (VMCP), at an occurrence of an input/output interruption, the system sets to a storage an event that the input/output interruption has been accepted and reserved by the VMCP. When the virtual machine processes interruption information by means of the hardware without an intervention of the VMCP, the virtual machine resets the state of the storage. When the virtual machine is set to an interruptible state, control is passed to the VMCP. The VMCP tests to determine whether or not the virtual machine has reset the state of the storage, thereby judging an acceptability of the interruption.

3 Claims, 5 Drawing Sheets

INSTRUCTION FORMAT OF TISTP INSTRUCTION

VIRTUAL MACHINE SYSTEM WITH VITUAL MACHINE RESETTING STORE INDICATING THAT VIRTUAL MACHINE PROCESSED INTERRUPT WITHOUT VIRTUAL MACHINE CONTROL PROGRAM INTERVENTION

The present invention relates to a virtual machine system.

In a virtual machine system (VMS), a plurality of logical computers, ramely, virtual machines (VMs) are allowed to run on a real computer at the same time. In a virtual machine system of the prior art, input/output instructions issued from an operating system (OS) and instructions on a virtual machine are intervened by a virtual machine control program (VMCP) so as to be simulated by software programs. In consequence, due to a long period of processing time, there has been a problem of a long overhead time.

In order to overcome this difficulty, there has been proposed a system in which the operations are directly achieved by a hardware system without any intervention of the VMCP, thereby minimizing the overhead associated with the input/output simulations. For example, reference is to be made to the IBM Programming Announcement Virtual Machine/Extended Architecture (VM/XA) Systems Facility (Feb. 12, 1985), the U.S. Pat. Ser. No. 4,494,189 entitled "Method and Means for Switching System Control of CPUs", and the Japanese Patent Application No. JP-A-60-150140 entitled "I/O Execution Method in Virtual Machine System".

In a computer system, an input/output processing is achieved when a software (an operating system) executes an input/output initiate instruction to activate an input/output processor. When the processing is completed, the input/output processor returns a response to the operating system. The response from the input/output processor is specifically classified into input/output interruptions and interruption information. Operations related to the input/output interruptions are accomplished as follows.

An input/output interruption occurred in the input/output processor is accepted by the operating system if the operating system is in an interruption acceptable state. If the operating system is in a state not to accept the interruption, the input/output interruption is kept reserved in the input/output processor as a pending interruption. Interruption information can be acquired when the operating system executes a Test Subchannel (TSCH) instruction. At the execution of the TSCH instruction, the system resets an interruption pending state indicating a condition that the input/output processor keeps interruption information.

The TSCH instruction is directly executed by the hardware regardless of the control of the VMCP.

Although a plurality of virtual machines can be operated in a virtual machine system, for a certain interval of time, the VMCP or either one of the virtual machines (VM0, VM1, etc) occupies the real machine for the operation. For details about the method of directly executing the input/output processing of the virtual machine by means of the hardware, reference is to be made to the Japanese Patent Application No. 63-164758 entitled "Input/Output Execution Method of Virtual Machine" and filed by U.S. Pat. application Ser. No. 373,216 June, 1989.

In a virtual machine system employing the method described in the Japanese Patent Application No. 63-164758 entitled "Input/Output Execution Method of Virtual Machine", the VMCP sets up the hardware so that an input/output interruption for an input/output initiate instruction of a virtual machine (e.g. VM0) is processed as follows. That is, when the VM0 is in operation, if the operating system on the virtual machine is in a state where the input/output interruption is acceptable, the operating system directly accepts the input/output interruption; otherwise, the input/output processor keeps the input/output interruption pending. In a case where the VM0 is not in operation, the VMCP accepts and reserves the input/output interruption.

In the virtual machine system set up as described above, if an input/output interruption for an input/output initiate instruction of the VM0 takes place when the VM0 is not in operation, the VMCP accepts and reserves the input/output interruption so as to set up the hardware in order to attain a chance to present the reserved interruption onto the operating system. Namely, the hardware is established such that when the VM0 starts its operation and hence enters a interruption acceptable state, control is passed to the VMCP. Under this hardware condition, when the operating system in the interruption unacceptable state issues a request of an execution of the TSCH instruction, the TSCH instruction is directly executed by the hardware without receiving any control from the VMCP, so that interruption information is passed to the VM0 and that interruption pending sate is reset in the input/output processor. Subsequently, when the operating system on the VM0 starts its operation so as to enter the input/output acceptable state, control is transferred to the VMCP with the hardware set up as described above. The VMCP accordingly present the reserved input/output interruption onto the VMO.

However, since interruption information to be acquired with respect to the input/output interruption is beforehand obtained by the VM0 at a point of time where the operating system on the VM0 executes the TSCH instruction, there arises a problem that the presented input/output interruption is an excessive information item.

SUMMARY OF THE INVENTION

It is therefore an object of the present invention to provide a virtual machine system having apparatus which solves the problems above while preserving the processing performance.

In order to achieve the object above, the virtual machine system in accordance with the present invention includes store apparatus for storing in (setting to) a virtual machine control program (VMCP) a fact or an event that an input/output interruption has been accepted for a reservation thereof, reset, apparatus operative when interruption information is processed by a virtual machine (VM) without receiving a control of the VMCP for resetting the state of the store apparatus, control apparatus for passing control to the VMCP when the VM is set to an interruptible state, and test apparatus for testing whether or not the VM as reset the state of the store apparatus.

In accordance with the present invention, owing to the provision of the apparatus above, in a case where an input/output interruption is accepted and is reserved by the VMCP, when the event is stored in the store apparatus and a VM processes interruption information without an intervention of the VMCP, the reset apparatus resets the state of the store apparatus. When the VM enters an interruptible state the control apparatus passes control to the VMCP. In the operation to present the input/output interruption thus accepted and reserved on a VM, the VMCP causes the test apparatus passes control to the VMCP. In the operation to present the input/output interruption thus accepted and reserved on a VM, the VMCP causes the test means to decide whether or not the VM has already obtained the interruption information and has reset the state of the store apparatus. If this is not the case, the VMCP presents the input/output interruption on the VM; otherwise, the VMCP releases or cancels the reservation of the accepted interruption without presenting to the VM the input/output interruption thus reserved.

BRIEF DESCRIPTION OF THE DRAWINGS

The invention may take physical form in certain parts and arrangements of parts which will be described in detail in this specification and illustrated in the accompanying drawings which form a part hereof and wherein.

DESCRIPTION OF THE PREFERRED EMBODIMENT

Figure 1:
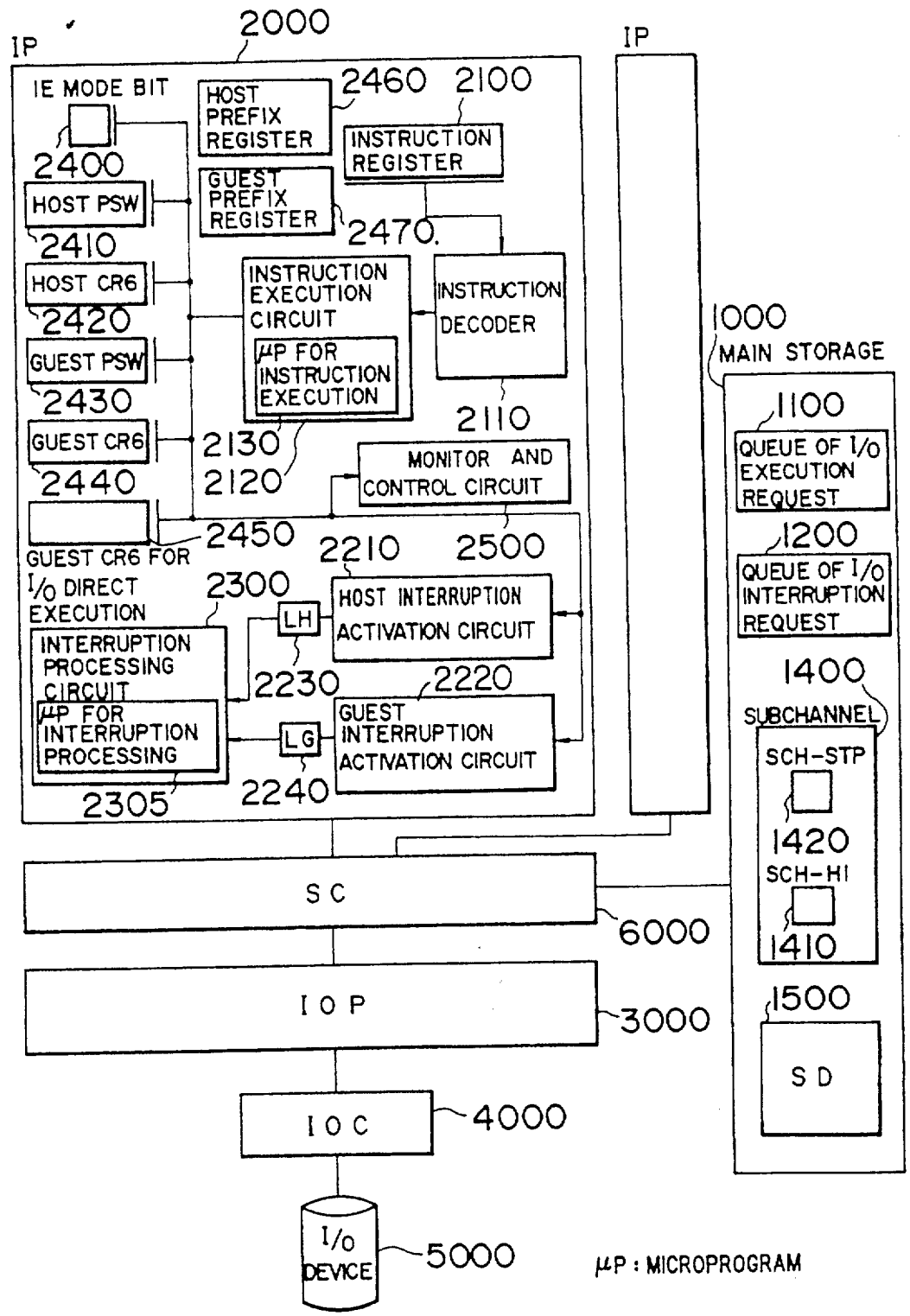
FIG. 1 is a block diagram schematically showing an input/output direct execution device in a virtual machine system as an embodiment in accordance with the present invention.

The problems above can be solved as follows. For example, at an occurrence of an input/output interruption for an input/output initiate instruction, if an operating system on a VM on which the input/output initiate instruction is executed is not in operation, the input/output interruption is pending by the hardware. At a point of time thereafter when the operating system starts its operation and hence enters a state to accept an input/output interruption, the pending input/output interruption is passed to the operating system. However, when the system includes a large number of virtual machines or when the real or actual computer is configured in a multiprocessor structure, the number of input/output interruptions to be pending by the hardware is increased, which inevitably lowers the processing performance of the system.

Referring now to the drawings, a description will be given of an embodiment according to the present invention.

FIG. 1 shows a functional configuration the virtual machine system including a main storage 1000, an instruction processor (IP) 2000, an input/output processor (IOP) 3000, an input/output controller (IOC) 4000, an input/output device 5000, and a system controller 6000.

Although this configuration includes one unit of the IOC and one unit of the input/output device, there are ordinarily disposed a plurality of units of IOCs and input/output devices in the virtual machine system.

The main storage 1000 stores therein an input/output (I/O) execution request queue 1100, an I/O interruption request queue 1200, subchannels 1400 of which the number is associated with the input/output devices 5000, and areas SD 1500 for storing states of the respective virtual machines, the number of these areas corresponding to the virtual machines. Each subchannel includes a bit SCH-STP 1420 representing an interruption pending state (to be referred to as a status pending herebelow) of the subchannel 1400 and a bit SCH-HI 1410 denoting an occurrence of a host interruption, namely, an event that an input/output interruption has accepted by the VMCP.

Furthermore, the instruction processor (IP) 2000 includes an instruction register 2100 for storing therein an instruction read out from the main storage 1000, an instruction decoder 2110 for decoding the instruction, an instruction executing circuit 2120 for executing the instruction, a host interruption activation circuit 2210 for deciding whether or not the VMCP is interruptible, an interruption processing circuit 2300 for achieving the interruption processing, and a monitor and control mechanism 2500 for monitoring an input/output interruptible state of a virtual machine so as to pass control to the VMCP when the interruptible state of the virtual machine is found. There are also disposed various kinds of control registers such as a VM execution mode (to be referred to as an IE mode herebelow) bit 2400, a host PSW 2410 and a host CR6 2420 associated with the VMCP, a guest PSW 2430 and a guest CR6 2440 for a VM, guest CR6 2450 for an input/output direct execution to keep therein a mask of an occupied subclass of a running virtual machine, a host prefix register 2460, and a rest prefix register 2470.

In the computer system above, a Start Interpretive Execution (SIE) instruction is executed to establish the IE mode. The SIE instruction has as an operand an address of a region SD 1500 in the main storage 1000 of FIG. 1. When the SIE instruction is executed, the instruction execution circuit 2120 sets the IE mode bit 2400 to "1" designating that the VM is running. The host PSW 2410 and the host CR6 2420 are respectively loaded with the contents of the PSW and CR6 of the host, namely, the VMCP. The guest PSW 2430 and the guest CR6 2440 are loaded with the contents of the PSW and CR6 of the VM stored in the SD 1500 specified by the operand of the SIE instruction. In the input/output direct execution guest CR6 2450, at bit positions associated with the subclass dedicated to the guest, mask, values of the virtual subclass corresponding to the dedicated subclass are set.

When an interruption request takes place, the host interruption activation circuit 2210 decides whether or not the host (VMCP) is interruptible based on the I/O mask of the host PSW 2410 and the host CR6 2420. If the VMCP is interruptible, the system sets a latch LH 2230 to '2'. The guest interruption activation circuit 2220 decides whether or not the guest is interruptible based on the I/O mask cf the guest PSW 2430 and the I/O direct execution CR6 2450. If interruptible, the system sets a latch LG (2240) to '1'.

Figure 2:
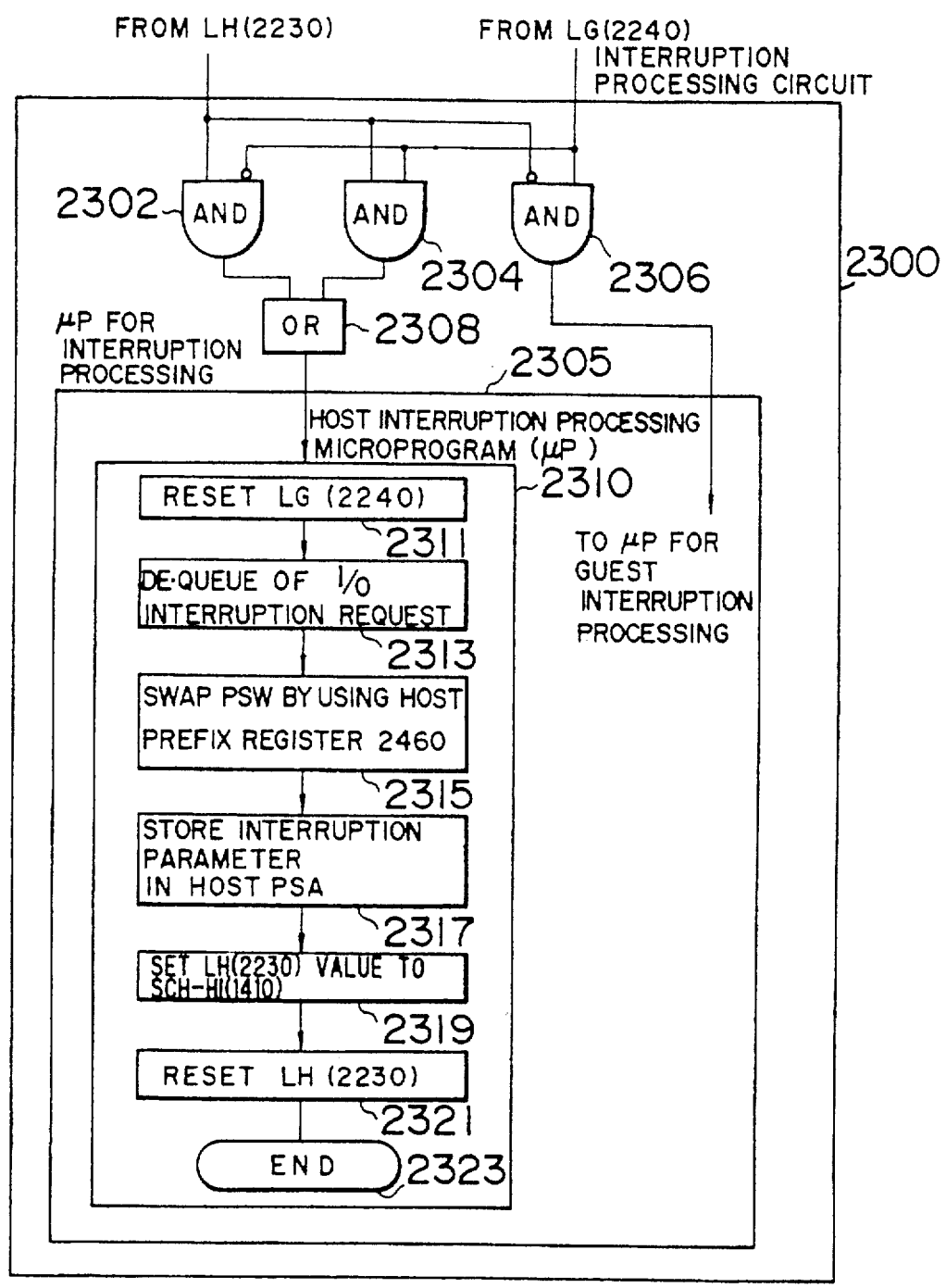
FIG. 2 is a flowchart of a host interruption processing.

FIG. 2 shows the interruption processing circuit 2300.

The signals from the latches LH 2230 and LG 2240 are processed through AND circuits 2302, 2304, 2306, and an OR circuit 2308 so as to initiate a guest interruption processing microprogram when only the latch LG 2240 contains '1' (only the guest interruption is possible), and to initiate a host interruption processing microprogram 2310 when the latches LH 2230 and LG 2240 respectively contain '1' (i.e. when the guest and host interruptions are possible) or when only the latch LH 2230 contains '1' (only the host interruption is possible).

The host interruption processing microprogram 2310 first resets the latch LG 2240 so as to dequeue the interruption request from the I/O request queue 1200 (step 2313) and then a PSW swap operation is accomplished by use of the host prefix register HPXR 2460. Subsequently, interruption parameters are attained from the subchannel so as to be stored in the host PSA (step 2317) and the value of the latch LH 2230 is loaded in the bit SCH-HI 1410 denoting a host interruption occurrence (step 2319) and then the latch LH 2230 is reset (step 2321), thereby completing the processing (step 2323).

Next, a description will be given of processing of a Test Subchannel (TSCH) instruction in which the state of the subchannel is checked and an Interruption information is stored.

Figure 3:
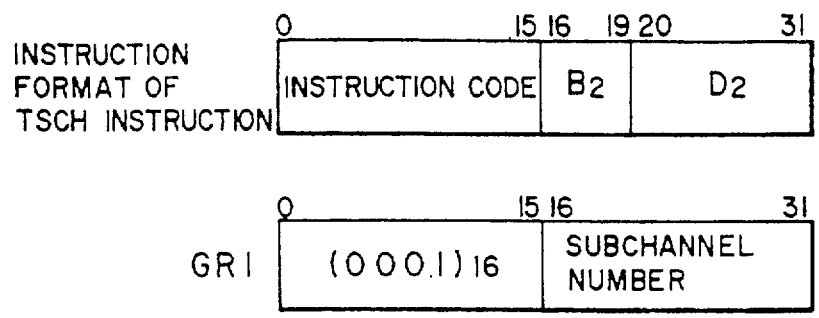
FIG. 3 is a schematic diagram showing an instruction format of a TSCH instruction.

FIG. 3 shows an instruction format of the TSCH instruction. For this instruction, bits 16 to 31 specify a subchannel number of a general register 1 (GR1) as shown in FIG. 3. Interruption information of the subchannel specified by the GR1 is stored in an area (B2+D2) on the main storage specified by the second operand. Thereafter, the state of the subchannel, namely, '1' or '0' of the status pending bit SCH-STP 1420 is reflected onto a condition code (CC). The content of the CC is '0' or '1' depending on the value of SCH-STP 1420 is '1' or '0', respectively. Furthermore, the field of the subchannel information to be stored is called an interruption response block.

Figure 4:
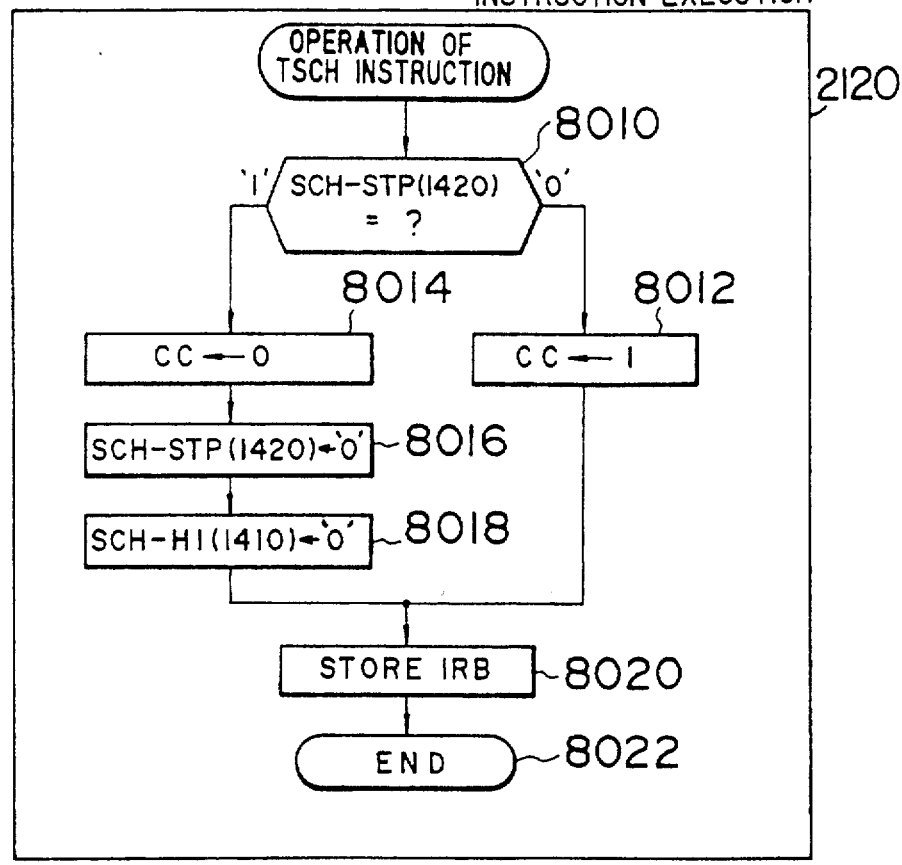
FIG. 4 is a flowchart of processing of the TSCH instruction.

FIG. 4 shows a flowchart of processing of a TSCH instruction in the instruction execution circuit 2120 by use of the instruction execution microprogram ($\mu$p) 2130.

First, the program checks to determine whether or not a subchannel specified by the general register 1 (GR1) is in the status pending (step 8010). If this is not the case (SCH-STP 1420='0'), 1 is set to the condition code (CC) (step 8012) and then control jumps to a step 8020. If the subchannel is in the status pending (SCH-STP 1420='1'), 0 is set to the condition code (CC) (step 8014) and then the content of SCH-STP 1420 is set to '0' (step 8016). Moreover, the bit SCH-HI 1410 indicating an occurrence of a host interruption of the subchannel is set to '0' (step 8018). This is a direction to VMCP if there exists an I/O interruption from the subchannel reserved in the VMCP, reserved I/O interruption is valid. Thereafter, the interruption response block (IRB) is stored in an area of the main storage specified by an operand of the instruction (step 8022), thereby completing the processing (step 8022).

Figure 5:
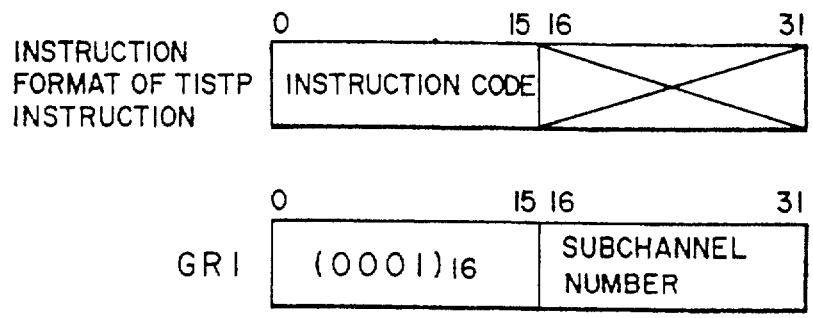
FIG. 5 is a diagram schematically showing a format of a TISTP instruction.

Next, a description will be given of processing of an instruction, Test Host I/O Interruption Status Pending (TISTP), which decides whether or not a host interruption is valid. FIG. 5 shows an instruction format of the TISTP instruction.

Figure 6:
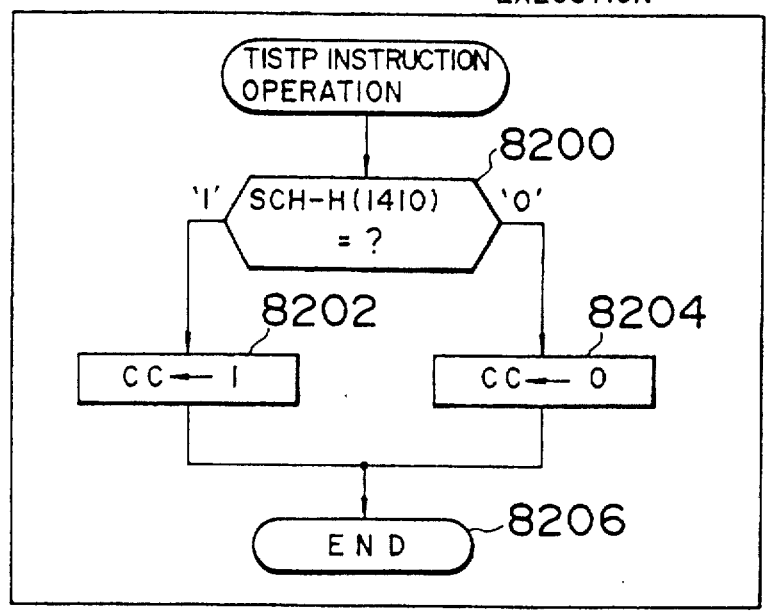
FIG. 6 is a of processing of the TISTP instruction.

The TISTP instruction tests the SCH-HI 1410 of a subchannel specified by bits 16 to 31 of the general register 1 (GR1) so as to reflect a result of the check onto the condition code (CC). The CC is set to 0 or 1 when the SCH-HI 1410 is '0' or '1', respectively. FIG. 6 shows processing of the TISTP instruction executed in the instruction execution circuit 2120 by use of an instruction execution microprogram ($\mu$P) 2130. First, the program checks to decide whether the SCH-HI 1410 of a subchannel specified by the general register 1 (GR1) is '1' or '0' (step 8203). Depending on the value '1' or '0' of the SCH-HI 1410, the CC is set to 1 (step 8202) or to 0 (step 8204), respectively, thereby completing the processing (step 8206).

By executing the TISTP instruction, the VMCP can decide whether or not an input/output interruption reserved in the VMCP is valid.

Figure 7:
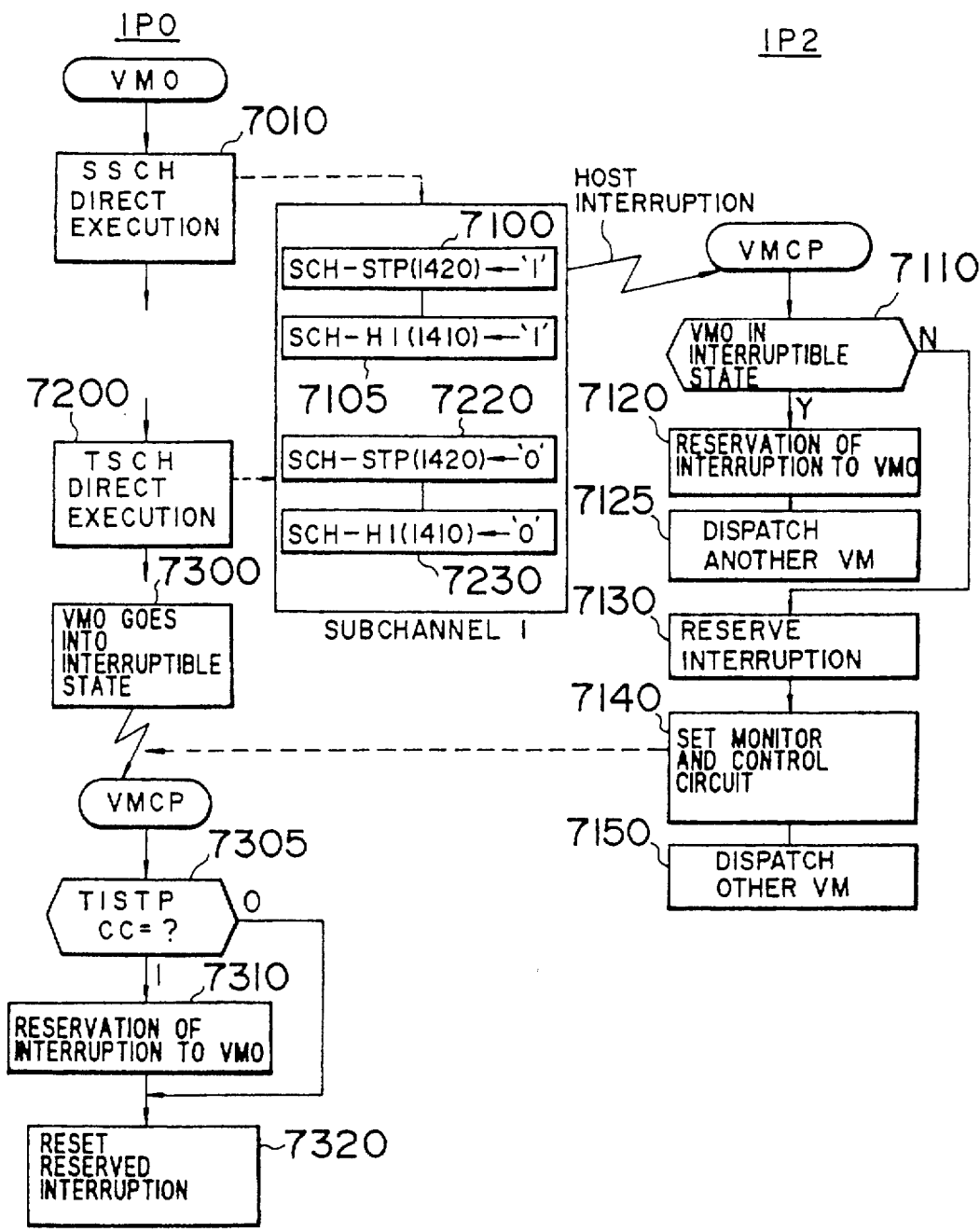
FIG. 7 is a flowchart showing operations of the virtual machine system as an embodiment according to the present invention.

Referring now to FIG. 7, a description will be given of a flow of the processing achieved in this embodiment.

In a real computer having two instruction processors IP0 and IP2, when VM0 is running on the IP0, an operating system on the VM0 issues an input/output initiate instruction, namely, a Start Subchannel (SSCH) instruction by specifying a subchannel 1. This instruction is directly executed (step 7010). And then the subchannel 1 is set to the status pending and SCH-STP 1420 is set to '1' (step 7100). A host interruption occurs in the IP2 in the wait state so as to set the SCH-HI 1410 to '1' (step 7105). In the IP2, the VMCP checks to determine whether or not the VM0 is interruptible (step 7110). If VM0 is interrupted, the interruption is presented to the VM0 (step 7120).

Subsequently, other virtual machine is depicted (step 7125), the input/output interruption is reserved (step 7130) and then the monitor and control circuit 2500 of the hardware is set so as to pass control to VMCP when the VM0 becomes to be interruptible thereafter (step 7140). Subsequently, other virtual machine is dispatched (step 7150).

Next, when an operating system operating on the VM0 running on the IP0 issues a TSCH instruction, this instruction is directly executed (step 7200). The SCH-STP 1420 is set to '0' (step 7220) and the SCH-HI 1410 is also set to '0' (step 7230).

Thereafter, when the VM0 becomes to be interruptible (step 7300), control is passed to the VMCP due to the hardware setting achieved in the step 7140. The VMCP then executes a TISTP instruction (step 7305) to decide whether the interruption reserved in the step 7130 is valid. As a result, if the content of CC is 1 or 0, the reserved interruption is presented to the VM0 (step 7310) or the interruption reservation is reset (step 7320), respectively.

As described above, in accordance with the present invention, in a case where an input/output operation is directly achieved on a virtual machine, it is possible to judge the validity of interruption reserved by the VMCP due to a host interruption, which prevents unnecessary interruptions from being reflected onto the virtual machine.

While the particular embodiment of the invention has been shown and described, it will be obvious to those skilled in the art that various changes and modifications may be made without departing from the present invention in its broader aspects.

We claim:

1. A virtual machine system having a virtual machine, a virtual machine control program, said virtual machine selectively processing input/output (I/O) interruptions with and without intervention of said virtual machine control program when said virtual machine is set to non-interruptible and interruptible states respectively, and instruction processor means connected to main storage means, said system comprising:

hardware subchannel means included in said main storage means;

store means, provided in said hardware subchannel means, or indicating by a set condition that an I/O interruption has been accepted and reserved by a virtual machine control program regardless of whether said virtual machine is interruptible;

reset means, provided in said instruction processor means, coupled to said store means, operative when said virtual machine is set to the non-interruptible state and has processed interruption information without an intervention of the virtual machine control program, for resetting said store means;

monitor and control means, provided in said instruction processor means, coupled to said store means, for permitting the virtual machine control program to control said system when the virtual machine is set to the interruptible state and said store means indicted a set condition; and test means, provided in said instruction processor means, coupled to said store means, for determining whether the virtual machine has reset said store means.

2. A virtual machine system according to claim 1 wherein said reset means rests said store means when the virtual machine executes a test subchannel (TSCH) instruction to process interruption information.

3. A virtual machine system according to claim 1 wherein said test means conducts a test, in response to an execution of a test host input/output (I/O) interruption status pending (TISTP) instruction by the virtual machine control program, to determine whether the virtual machine has reset the store means.

* * * * *